April 29, 1958 H. C. SIMONS ET AL 2,832,277
VEHICLE HEATING AND VENTILATING APPARATUS
Filed July 29, 1953 8 Sheets-Sheet 1

INVENTORS
HOMER CHARLES SIMONS &
BY CLARENCE G. NENADAL
Hudson, Boughton,
Williams, David & Hoffmann
ATTORNEYS April 29, 1958     H. C. SIMONS ET AL     2,832,277
VEHICLE HEATING AND VENTILATING APPARATUS
Filed July 29, 1953     8 Sheets-Sheet 2

INVENTORS
HOMER CHARLES SIMONS &
BY CLARENCE G. NENADAL
Hudson, Boughton,
Williams, Davis & Hoffmann
ATTORNEYS

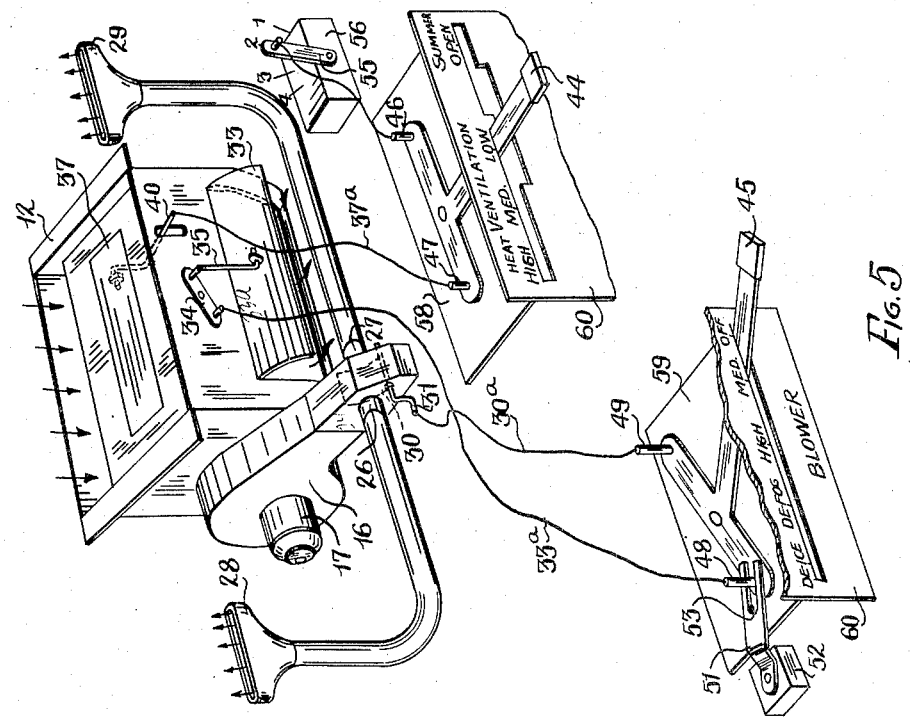
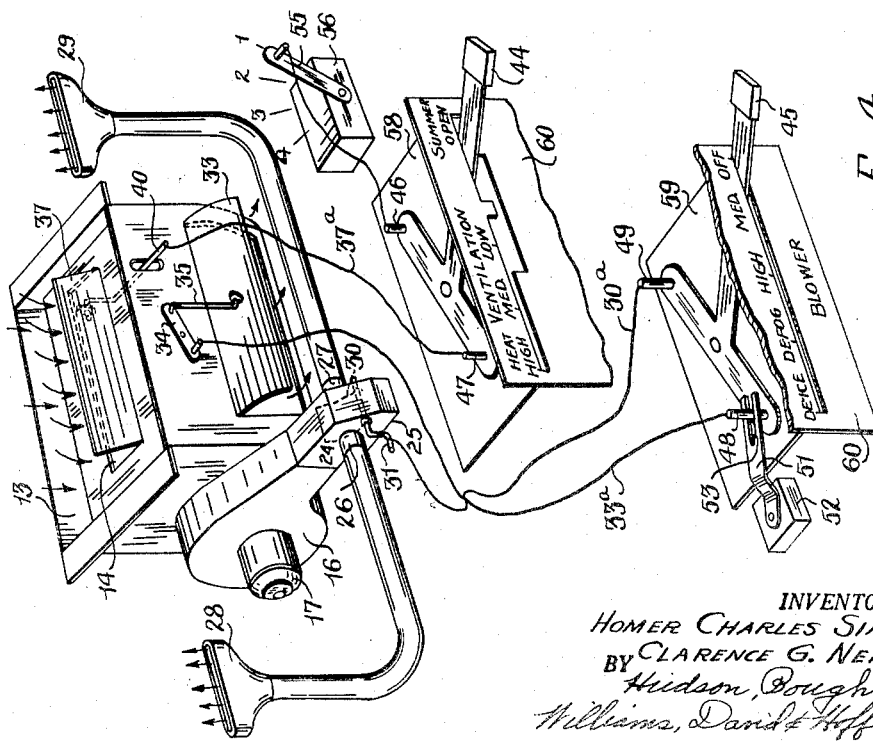

INVENTORS
HOMER CHARLES SIMONS &
BY CLARENCE G. NENADAL
Hudson, Boughton,
Williams, David & Hoffmann
ATTORNEYS April 29, 1958     H. C. SIMONS ET AL     2,832,277
VEHICLE HEATING AND VENTILATING APPARATUS
Filed July 29, 1953     8 Sheets-Sheet 5

INVENTORS
HOMER CHARLES SIMONS &
CLARENCE G. NENADAL
BY
Hudson, Boughton,
Williams, David & Hoffmann
ATTORNEYS April 29, 1958  H. C. SIMONS ET AL  2,832,277
VEHICLE HEATING AND VENTILATING APPARATUS
Filed July 29, 1953  8 Sheets-Sheet 6

INVENTORS
HOMER CHARLES SIMONS &
CLARENCE G. NENADAL
BY
Hudson, Boughton,
Williams, Davis & Hoffmann
ATTORNEYS April 29, 1958 H. C. SIMONS ET AL 2,832,277
VEHICLE HEATING AND VENTILATING APPARATUS
Filed July 29, 1953 8 Sheets-Sheet 7

INVENTORS
HOMER CHARLES SIMONS
BY CLARENCE G. NENADAL
Hudson, Boughton,
Williams, David & Hoffmann
ATTORNEYS April 29, 1958  H. C. SIMONS ET AL  2,832,277
VEHICLE HEATING AND VENTILATING APPARATUS
Filed July 29, 1953  8 Sheets-Sheet 8

INVENTORS
HOMER CHARLES SIMONS &
BY CLARENCE G. NENADAL
Hudson, Boughton,
Williams, David & Hoffmann
ATTORNEYS

United States Patent Office 2,832,277
Patented Apr. 29, 1958

2,832,277
VEHICLE HEATING AND VENTILATING APPARATUS

Homer Charles Simons, South Euclid, and Clarence G. Nenadal, Cleveland, Ohio, assignors to Eaton Manufacturing Company, Cleveland, Ohio, a corporation of Ohio Application July 29, 1953, Serial No. 370,974

15 Claims. (Cl. 98—2)

The present invention relates to heating and ventilating devices for vehicles and aims to provide an improved device for this kind which is of a simple and compact construction and which has the necessary flexibility to meet varying seasonal conditions that make it desirable to supply heated or unheated air to various points within the vehicle.

Another object of the present invention is the provision of a new and improved heating and ventilating device of this kind employing a heat-exchange element, a blower, and means to supply fresh air to the element, the device having novel means to distribute heated or unheated air to the passenger compartment of the vehicle under natural or blower pressure, heated or unheated air to the defrosters of the vehicle under blower pressure, or heated or unheated air simultaneously to the passenger compartment and the defrosters.

A further object of the present invention is the provision of a new and improved heating and ventilating device embodying a heater to heat fresh air to be delivered to the passenger compartment of a vehicle and having means to by-pass the heater so that unheated air may be supplied to the compartment, which device is so constructed and arranged that the heater is rendered inoperative when the by-pass is in position to deliver unheated air to the passenger compartment.

Still another object is to provide a new and improved vehicle heating, ventilating, and defrosting apparatus having a heat exchange element, a blower, and a temperature and air distribution control mechanism including movable air flow control members, a heating medium control valve, and a blower switch, the control mechanism having various settings so that the desired distribution of heated or unheated air may be obtained.

Yet another object of the present invention is the provision of a heating and ventilating device embodying a heater, a blower, means for delivering air directly to a compartment of the vehicle from the heater, and means for directing substantially all or part of the air discharged from the blower to either the compartment or the defrosters of the vehicle or to both, the device being so constructed and arranged that when the control to operate the blower is moved to a blower operating position, the means for delivering air directly from the heater to the compartment is simultaneously restricted or closed.

The invention can be further briefly summarized as consisting in certain novel combinations and arrangements of parts hereinafter described and particularly set out in the claims hereof.

In the accompanying sheets of drawings,

Fig. 4 is a perspective view, partly schematic, of a heating and ventilating device embodying my invention and the controls therefor showing the positions of the various air distributing members and controls for summer operation;

Fig. 5 is similar to Fig. 4 but showing the control setting and the corresponding positions of the air distributing members for delivering heated air at a low temperature directly from the heating element to the passenger compartment;

Figure 1:
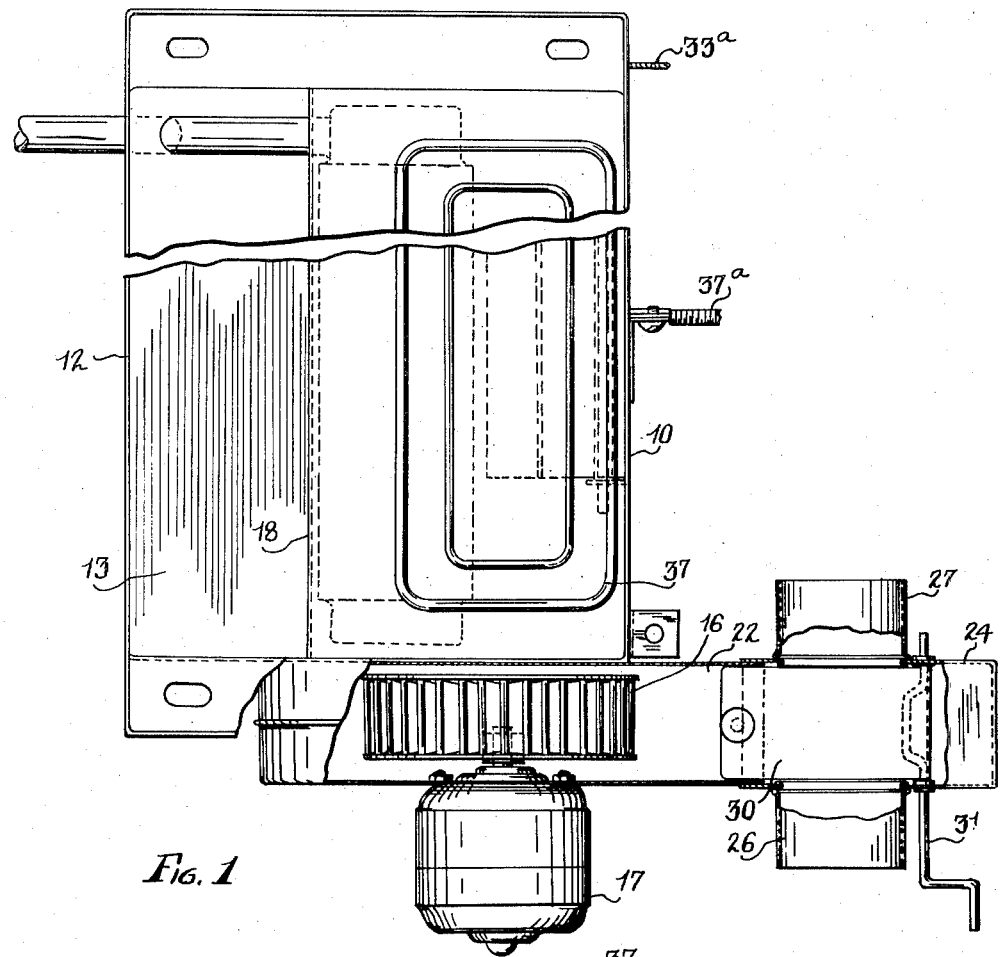
Fig. 1 is a plan view, partly cut away, of a heating and ventilating apparatus embodying the present invention.
Figure 2:
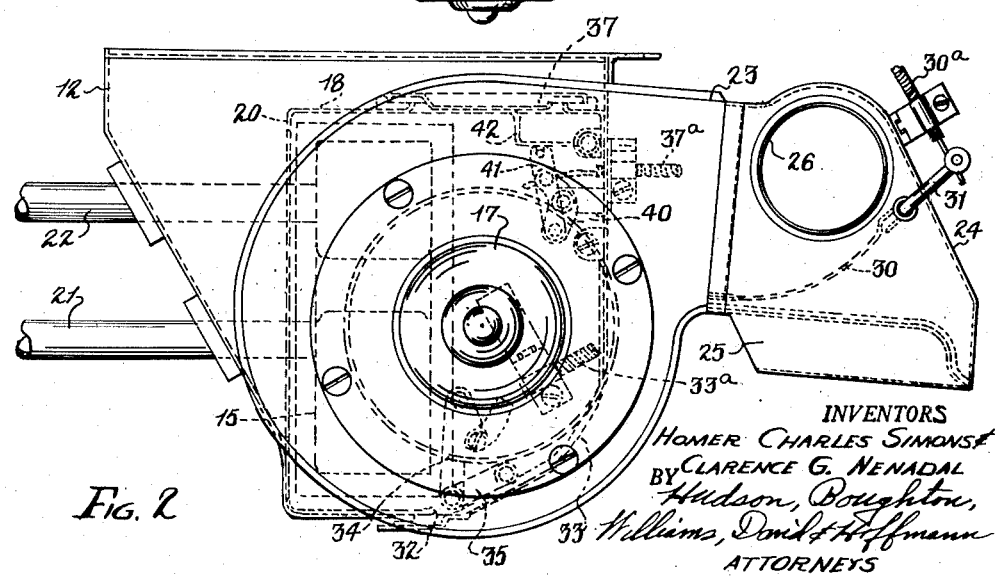
Fig. 2 is a side elevational view of the apparatus shown in Fig. 1.
Figure 3:
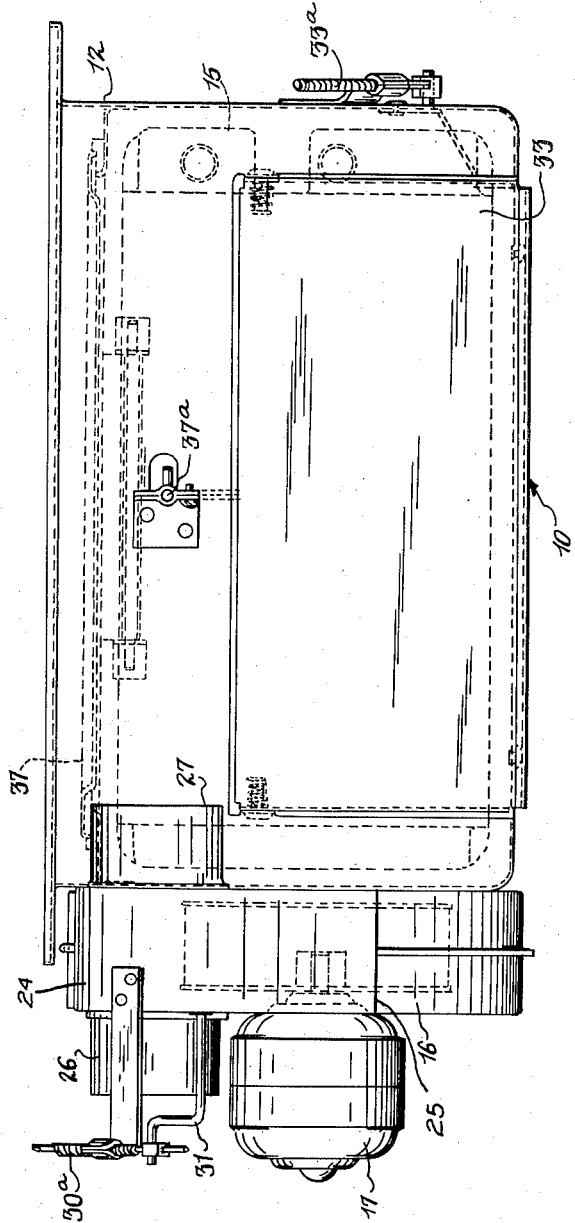
Fig. 3 is a front elevational view of the apparatus of Fig. 1.

Proceeding now with a more detailed description of this invention, the drawings show the improved heating and ventilating device in the form of a self-contained unit 10 adapted to be installed in the vehicle compartment which is to be heated and ventilated. The device 10 comprises, in general, a housing 12 having inlet and outlet chambers 13 and 14, respectively, a heat-exchange element 15, and a blower 16 driven by a motor 17. The inlet and outlet chambers are separated by a horizontal wall 18 extending inwardly from a front wall 19 of the housing 12 and a vertical wall 20 intermediate the front and back wall of the housing 12. The vertical wall 20 has an opening therein and heating element 15 is located adjacent this opening within the outlet chamber 14. The heater core or heat-exchange element 15 illustrated in the drawings is of conventional construction and is in the form of a core having numerous air passages through which air can flow from the inlet chamber 13 to the outlet chamber 14. The heater core 15 is provided with supply and return conduits 21, 22, respectively, for the heating medium such as hot water from the engine cooling system used to provide the heat for the air to be heated. The supply and return conduits are connected to the same end of the core which is characteristic of a core. The top of the housing 12 is open and air is supplied thereto by a duct or conduit means connecting the top of the housing to a fresh air intake, not shown, which may be a cowl ventilator or the like. The air is preferably forced into the inlet chamber 13 and through the heater core 15 in the direction of the arrows A by the forward motion of the vehicle. The invention, however, is not limited to the particular method of supplying air to the housing 12.

The blower 16 and motor 17 is located at one end of the housing 12 and the intake of the blower communicates with the outlet chamber 14 of the housing 12. The blower shell is provided with a tangential outlet 23 for delivering air from the blower. The outlet 23 is connected to an air distributing chamber 24 having a passenger compartment outlet 25 in the bottom thereof and defroster outlets 26, 27 in the opposed side walls of the chamber. The outlets 26, 27 are connected to defrosters 28, 29 respectively. For directing the flow of air into the compartment or into the defroster outlets 26, 27, or for dividing the air between the compartment and the defrosters, a gate or movable baffle 30 operated by Bowden wire 30a is mounted within chamber 24. The wire 30a is connected to a crank arm 31 supported between the side walls having the outlets 26, 27 therein. The crank 31 extends outwardly of the chamber 24 for connection to the wire 30a. The baffle 30 may be moved to a lower position substantially by-passing or closing the compartment outlet 25 or to an up position substantially closing or by-passing the defroster outlets 26, 27 as well as to intermediate positions for dividing the flow of air between the compartment and the defrosters.

The front wall 19 of the housing 12 which is directly opposite the heater core 15 is provided with an opening 32 for delivering air directly from the core to the passenger compartment. The flow of air through the opening 32 is controlled by a door 33 pivotally connected along its upper longitudinal edge to the front wall for movement to and from the opening. A Bowden wire 33a for operating the door 33 is supported at the end of the housing 12 opposite the motor 17 and is connected to a rocker arm 34, the rocker arm in turn being connected to the door 33 by a link 35. The rocker arm 34 and link 35 are supported on the inside of the end wall of the housing 12 and form a toggle linkage which is moved toward its straight-line position to open the door 33.

It is often desirable to by-pass the heater core 15 and supply fresh or unheated air directly to the passenger compartment or to the blower for distribution to the passenger compartment or defrosters, or both. The horizontal wall 18 is provided with an opening having a cover 37 movable to an open position to allow the air to pass directly from the inlet chamber 13 to the outlet chamber 14 without going through the heater core 15. The cover 37 is controlled by a Bowden wire 37a connected to one arm of a bell crank lever 40 pivotally fixed to the front wall 19 below the cover 37. The other arm of the bell crank lever 40 is connected to a link 41 which is in turn connected to a supporting and operating member 42 for the cover 37. The supporting member 42 is pivoted to the front wall 19 of the housing 12 so that the cover 37 may be moved to and from a closed position. The linkage for operating the cover 37 is substantially a lost-motion linkage in a broad or general sense in that the movement of the Bowden wire 37a will produce substantially no corresponding movement of the cover while the connection between the lever 40 and the link 41 is moving through the lower portion of their arc where the linkage is moving substantially through dead center, since the dead center position of the linkage corresponds with the closed position of the cover 37. The Bowden wire type of actuating means will also provide lost motion due to its flexibility and ability to bow after the cover 37 is closed. Additional lost motion, if desired, may be provided by suitable means known to those skilled in the art such as by permitting play in the cover hinge or in various connections of the linkage.

The operation of the heating and ventilating system is controlled by a temperature control lever 44 and a blower control lever 45. The control levers 44, 45 are T-shaped and each one is pivotally supported at approximately the mid-point of the crosspiece of the T, the leg of the T being adapted to be grasped by the operator for moving the lever about its pivot. Lever 44 has pins 46, 47 extending perpendicularly from the opposite ends of the crosspiece and lever 45 is provided with similar pins 48, 49. Bowden wire 33a which controls the position of the door 33 is connected to the pin 48 at one end of the crosspiece of the lever 45 and the pin 49 at the other end of the crosspiece of lever 45 is connected to the crank arm 31 which controls the position of baffle 30 for directing the air discharged from the blower 16. The pin 48 also operates a switch arm 51 of a switch 52 which in the preferred embodiment is a five position switch. The arm 51 is provided with a slot 53 to allow relative movement of the pin 48 with respect to the arm as the lever 45 is moved. The switch 52 controls the operation of the blower motor 17 which is, in the preferred embodiment, a two-speed motor having medium and high speeds. The switch arm 51 may be moved counterclockwise from an off position to four positions, the first of the four positions connecting the blower to operate at its high speed, the second at its high speed, the third at its medium speed, and the fourth at its high speed.

Figure 13:
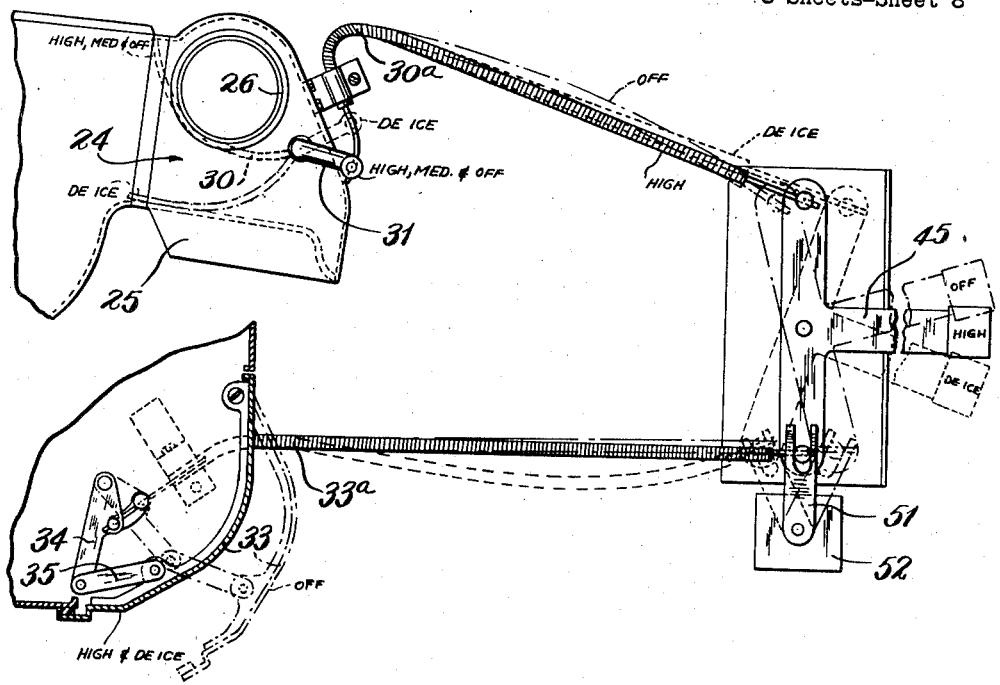
Fig. 13 is a view, partly diagrammatic, showing the blower control lever and associated mechanism in three different positions; and, Fig. 14 is a view, partly diagrammatic, showing the temperature control lever and associated mechanism in three different positions.

The Bowden wires 30a, 33a are of such length and arranged so that when the lever 45 is moved about its pivot point from right to left in the illustrated embodiment the door 33 will first close and the damper 30 moved to allow the air delivered from the blower to pass into the defroster outlets 26, 27. When the lever 45 is moved in a direction, from left to right, to open the door 33, the baffle 30 will first be moved to a position directing the major portion of the air from the blower 16 into the compartment and will remain in this position through the continued movement of the lever 45 necessary to open the door 33. Any suitable lost motion means may be used to interconnect the baffle 30, the door 33, and the lever 43, such as the means shown and described in Simons Patent 2,634,670, issued April 14, 1953, to allow the baffle or the door to remain in one position while the position of the other is being varied. In the illustrated embodiment, the length of the Bowden wires 30, 33a are substantially equal to the distance between their connection to the lever 45 and the crank arm 31 and the rocker arm 34 respectively when the lever 45 is in an intermediate position designated in the drawings as the "High" position. In the "High" position the baffle 30 substantially blocks the defroster outlets 26, 27 directing substantially all the air from the blower into the passenger compartment outlet 25. In this position the outer end of the baffle 30 is against the housing of the air distributing chamber 24 and prevents movement of the baffle when a force is applied to the crank arm 31 in a clockwise direction, as the latter is viewed in Fig. 13. Movement of the lever 45 in a counterclockwise direction from the "High" position will not, therefore, cause movement of the baffle 30 but only a bowing of the Bowden wire 30a. This counterclockwise movement of the lever 45 from its "High" position will, however, move the rocker arm 34, through the Bowden wire 33a, from the lower end of its slot to the upper end to cause a straightening of the toggle linkage formed by the arm 34 and link 35 and the opening of the door 33. If the lever 45 is moved clockwise from its "High" position, the baffle 30 will move to a position substantially blocking the compartment outlet 25 and since the door 33 is closed, and cannot move further in a closing direction, the Bowden wire 33a will bow as indicated in Fig. 13. It can now be seen that when the lever 45 is moved to its extreme counterclockwise position the baffle 30 is in an up position blocking the defroster outlets, the Bowden wire 30a is bowed and the door 33 is in a wide-open position. As the lever is moved clockwise, the Bowden wire 30a unbows as the door 33 is closed and as the lever 45 is moved from its "High" position to its extreme clockwise position the baffle 30 moves to a position blocking the compartment outlet 25 and the Bowden wire 33a for operating the door bows to the position indicated in Fig. 13.

The temperature of the air being supplied to the vehicle is controlled by the position of the lever 44. The pin 46 at one end of the crosspiece of the lever 44 is connected to the control arm 55 of a thermostatic control valve 56 which functions to determine the temperature to which the air passing through the core 15 is heated by a Bowden wire 56a. The thermostatic valve 56 is schematically shown in Figs. 4 through 11 and is preferably located in the heating medium supply conduit for the heater core 15. One form of such a control valve includes a thermal responsive element comprising a hollow expansible device having a highly volatile fluid therein which changes in vapor pressure in accordance with the rise and fall of its temperature to cause expansion and contraction of the device. A spring is arranged to mechanically oppose the expansible device and tends to open the valve as the pressure in the device decreases, hence by adjusting the tension of the spring, the temperature at which the valve operates can be varied. The construction of such thermostatic valves is well-known and therefore is not shown or described in detail herein. It may, however, be of the type disclosed in U. S. Patent 2,602,593 to E. C. Raney, issued July 8, 1952. This patent merely illustrates one form of a thermostatic valve which may be used with the present invention and any suitable valve may be substituted therefor. The thermostatic valve 56 has a plurality of temperature positions, four in the illustrated embodiment, one of the positions being an off position which overrides the thermostatic control for the valve and prevents any heating fluid whatsoever from being supplied to the heater core 15 rendering it inoperative. When the lever 44 is in its extreme right position, as in the illustrated embodiment, the thermostatic valve is in its off position and as the lever is moved from the right to the left the valve control arm 55 is moved to one of its other temperature positions which, in the drawings, are indicated as low, medium, and high.

Figure 14:
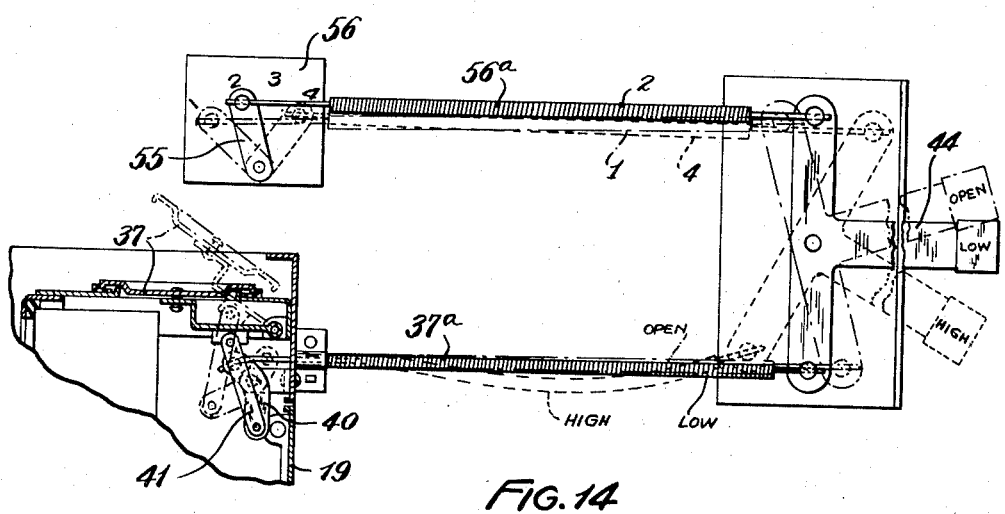

The pin 47 extending from the end of the crosspiece of the lever 44 opposite the pin 46 is connected by a Bowden wire 37a to the operating lever for the cover 37. The linkages connected to pins 46 and 47 are so constructed and interconnected that when the lever 44 is in its extreme right position, as illustrated in Fig. 4, where the thermostatic valve is in its off position, the door 37 is in an open position so that air may pass directly from the inlet chamber 13 to the outlet chamber 14 without passing through the heater core 15. However, when the lever is moved from its extreme right position to a position where the thermostatic valve is allowed to supply heating fluid to the heater core 15, the cover 37 is actuated to a closed position so that the air must pass through the heater core to travel from the inlet chamber 13 to the outlet chamber 14. After the door 37 is closed, continued movement of the lever 44 to increase the temperature will cause a bowing of the cable 37a, as is best shown in Fig. 14, since the door 37 is not free to move further in a closing direction. It is now apparent that in effect a lost motion connection is provided between the cover 37 and the lever 44 interconnecting the cover and the thermostatic valve whereby the cover 37 is open when the valve is in its off position and enabling the thermostatic valve to be moved to a plurality of temperature positions when the cover is in closed position.

Operation

To facilitate operation of the various controls by the operator of the vehicle and also to clarify the following explanation, the levers 44, 45 are provided with indicating panels to indicate the various positions of the levers. As shown in the drawings of the preferred embodiment, the thermostatic valve is in a complete off position when the lever 44 is moved counterclockwise to the extreme right and the three temperature positions to which the lever may be set are obtained by moving the lever in a clockwise direction about its pivot point. The blower control lever 45 is illustrated as having five positions including an "Off" position, a "Med." speed blower position, a "High" speed blower position, a "De-fog" position, and a "de-ice" position. When the lever 45 is at its extreme right it is in its off position and may be moved to the other positions in the order named by moving the lever to the left thereby rotating it clockwise about its pivot.

Figure 7:
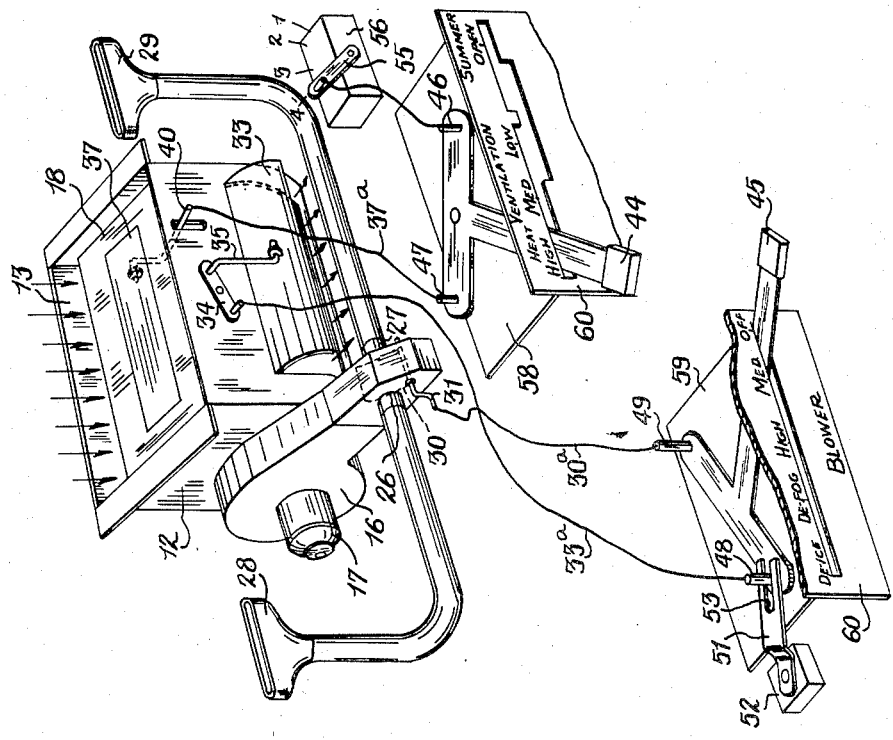
Fig. 7 is similar to Fig. 5 but showing the positions for the delivery of the air at a high temperature.
Figure 6:
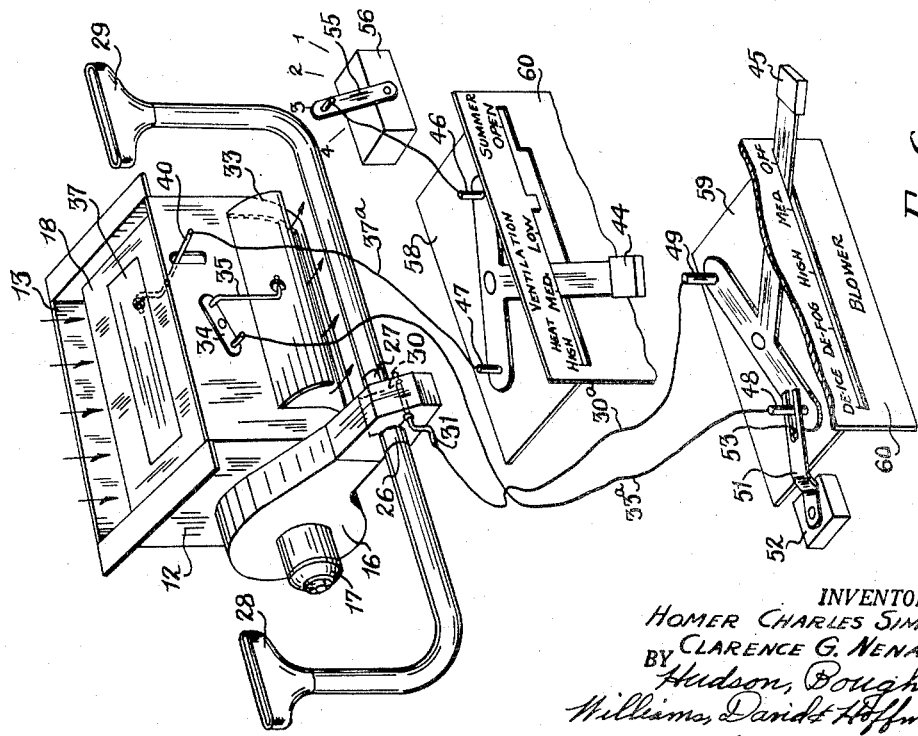
Fig. 6 is similar to Fig. 5 but showing the positions for the delivery of the air at a medium temperature.

Fig. 5 illustrates the positions of the controls to deliver air heated at a low temperature directly from the heater core 15 to the compartment of the vehicle under the pressure produced by the forward motion of the vehicle. In this position the thermostatic control lever is set in the "Low" position. Corresponding to this position, the thermostatic valve is in its position number "2," as shown in the drawing, and the door 37 is closed preventing air from by-passing the heater core. Figs. 6 and 7 illustrate the additional positions of the thermostatic valve and the control lever 44 when it is desired to deliver air heated to higher temperatures directly from the heater core 15 to the passenger compartment. The lever 44 is moved to either "Med." or "High" position changing the position of the control arm 55 of the thermostatic valve. The cover 37, however, remains in a closed position due to the connection between it and the lever 44. It is to be noted that in Figs. 5, 6 and 7 the blower is illustrated as being in the "Off" position.

Figure 9:
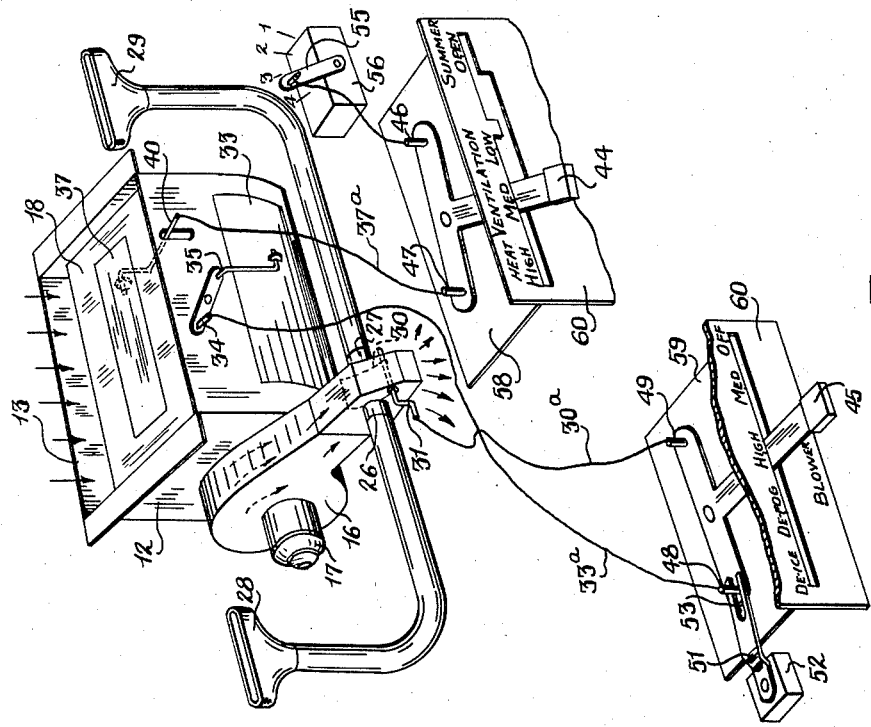
Fig. 9 illustrates the distribution and flow of air when the blower control is set to operate the blower at a high speed.
Figure 8:
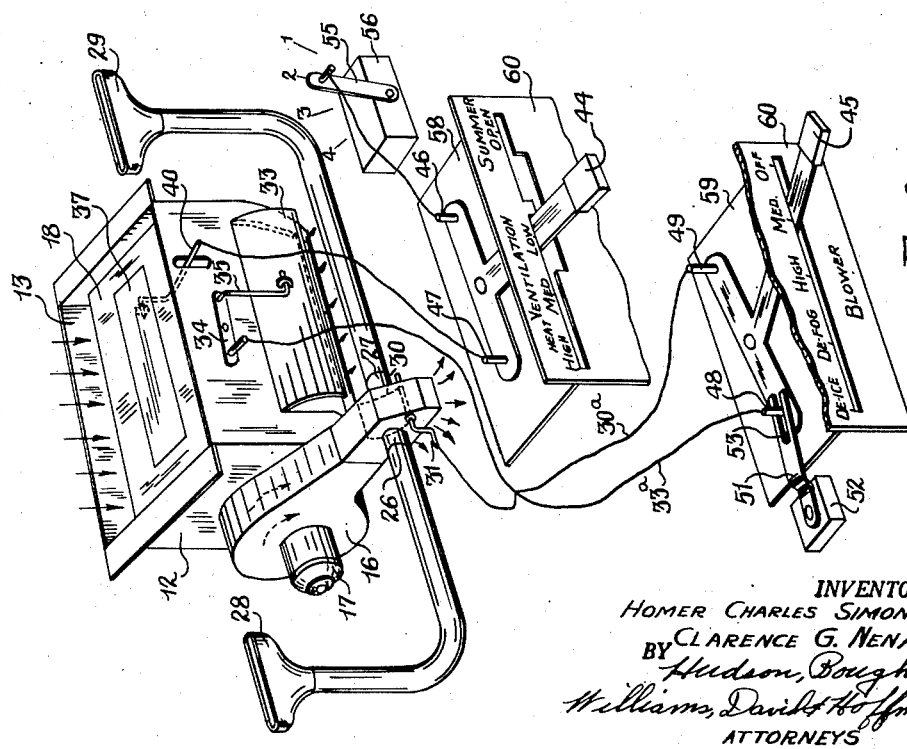
Fig. 8 illustrates the flow of air when the blower control is set to operate the blower at its medium speed.

Figs. 8 and 9 illustrate the positions of the various members controlling the distribution of the air when air is to be delivered under blower pressure. Referring to Fig. 8, when the lever 45 is moved to the "Med." position, the switch arm 51 is moved to energize the motor 17 for operating the blower at a medium speed. As the lever 45 is moved from its "Off" position to its "Med." position, the door 33 is moved from its fully open position to a position partially restricting the direct flow of air from the outlet chamber 14 to the passenger compartment. This increases the pressure within the outlet chamber 14 for a given condition providing a higher blower suction pressure thereby increasing the blower output. The baffle 30 for the "Med." position is an up position where substantially all the air delivered from the blower is directed into the compartment through the compartment outlet 25 and only a minor portion is allowed to pass into the defroster outlets 26, 27 and thence to the defrosters 28, 29. When the blower is being operated, the temperature control lever 44 may be moved in any of its four positions to determine the temperature of the air being delivered. If, however, the lever 44 is moved to its extreme right so that the thermostat is in its first position or "Off" position, the cover 37 will be open and the air being delivered by the blower will be unheated.

The movement of the blower control lever to the "High" position causes the blower to operate at a high speed and the door 33 to move to its fully closed position. The damper 30 remains in an up position substantially by-passing the defrosters 28, 29 as illustrated in Fig. 9.

Figure 11:
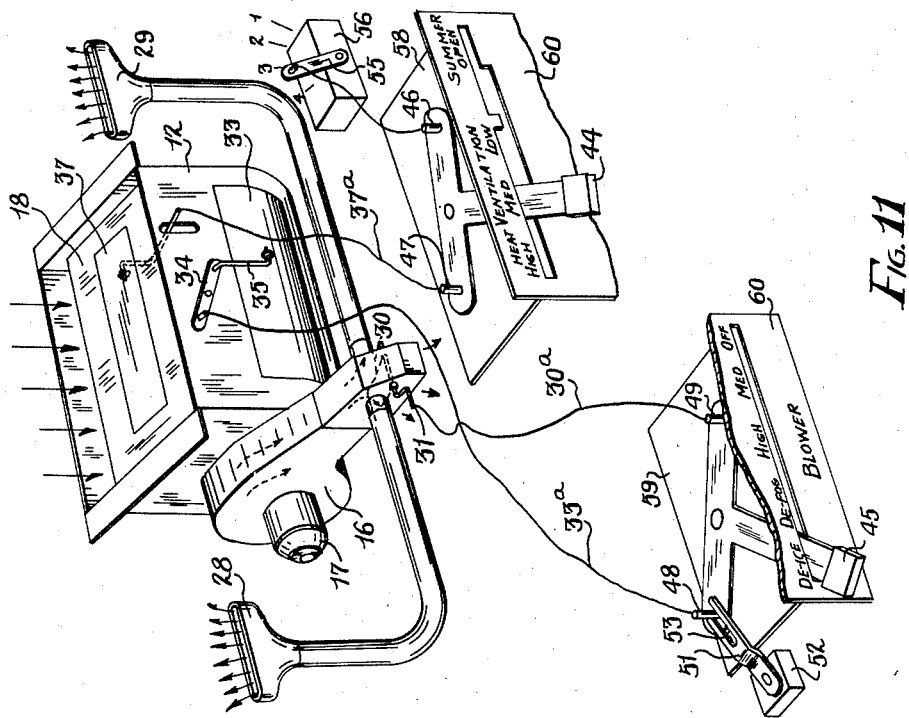
Fig. 11 is similar to Fig. 10 but illustrating the supply of de-icing air to the defrosters of the vehicle.
Figure 10:
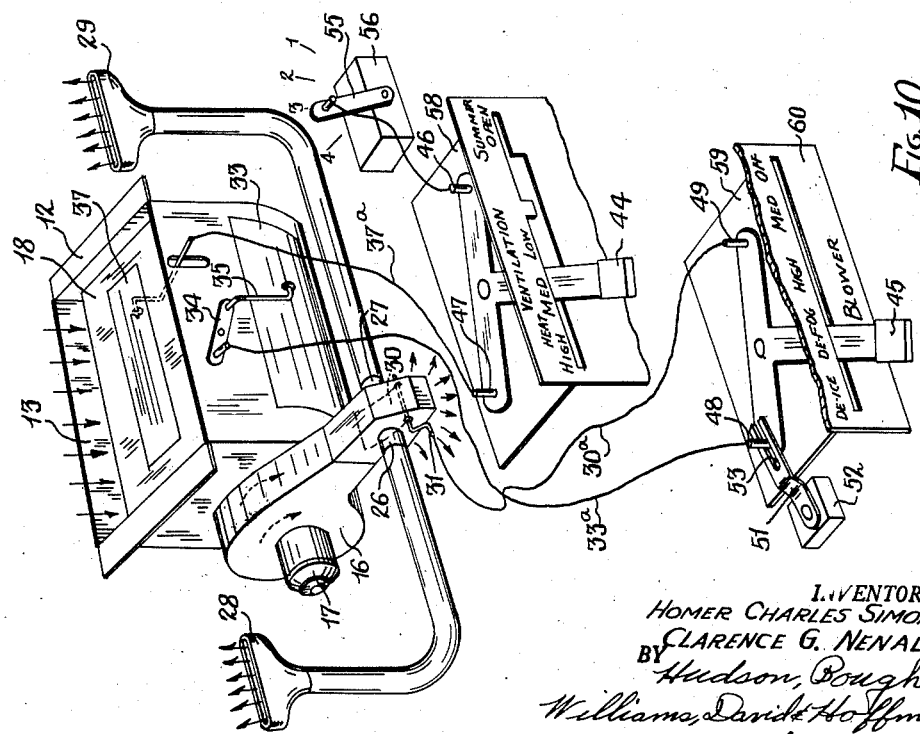
Fig. 10 illustrates the control settings and the position of the various members controlling the distribution and flow of air when it is desired to supply de-fogging air to the defrosters of the vehicle.
Figure 12:
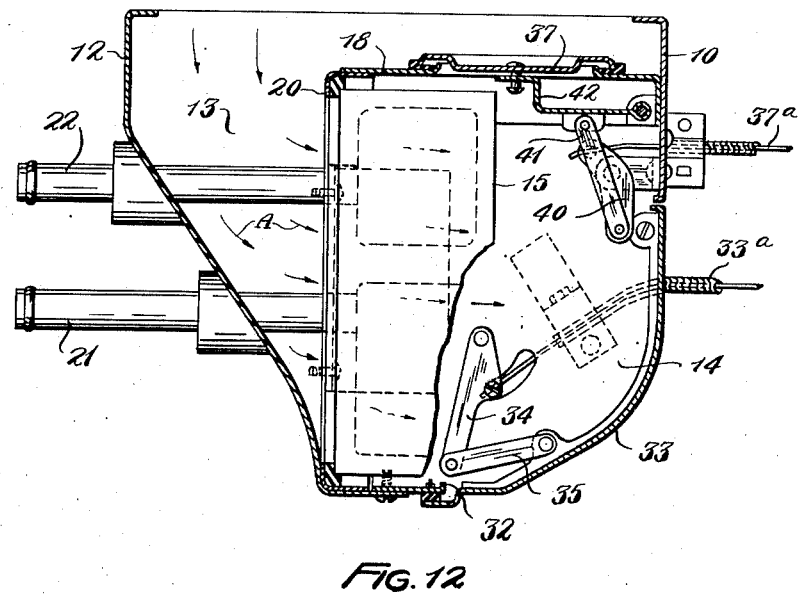
Fig. 12 is a vertical sectional view of the apparatus of Fig. 1.

Fig. 10 illustrates the position of the blower control lever 45 when it is desired to de-fog the windshield as distinguished from de-icing. In the latter case substantially more heated air is required to raise the temperature of the windshield for melting any ice which may be accumulated thereon. In the "De-fog" position the blower is operated at its medium speed, the door 33 is in its closed position, and the baffle 30 is in a mid-position which about equally divides the air being delivered from the blower between the compartment and the defrosters 28, 29. When the control lever 45 is moved to the de-ice position as illustrated in Fig. 11, the blower is operated at its high speed and the baffle 30 is moved to a position which substantially by-passes the compartment outlet 25 and directs the major portion of air being delivered by the blower to the defrosters 28, 29. It is to be noted that in all the settings of the blower control lever 45, the air being supplied to the blower may be either heated or unheated depending upon the position of the temperature control lever 44.

The control levers 44, 45 may be mounted on a support comprising two spaced horizontal members 58, 59 extending from a vertical member 60. The levers may extend through the vertical member and the necessary markings applied to the face thereof as illustrated in the drawings. The vertical member in the drawings has been separated for the sake of clarity and to simplify explanation.

Although in describing my improved heating and ventilating device I have spoken of "unheated" or "fresh" air being supplied to the inlet chamber 13, it should be understood that this term is used in a relative sense because the air supplied to this chamber could be recirculated air and in that case would be partially heated. Likewise, it should be understood that although the heater core 15 has been described as being used for heating the air, this core could also be used to cool the air in which case a cooling or refrigerating medium would be supplied thereto through the conduits 21 and 22 instead of a heating medium, or any suitable heat-exchange element could be substituted therefor.

From the foregoing description and the accompanying drawings it will now be readily understood that the present invention provides a new and improved heating and ventilating device especially adapted for use in an automobile by which heated or unheated air can be supplied to various parts of the automobile in varying amounts, the device being so constructed and arranged that it may be quickly and easily adjusted to distribute the air to the points desired and at the temperature desired.

While we have illustrated and described our improved heating and ventilating device in considerable detail, it will be understood of course that we do not wish to be correspondingly limited but regard our invention as including all changes and modifications coming within the scope of the appended claims.

Having thus described our invention, we claim:

1. In a ventilating and heating system of the character described, a housing having partition means defining an inlet chamber and an outlet chamber, said partition means having an opening communicating with said chambers to allow the passage of air therebetween and said housing having an air intake opening communicating directly with said inlet chamber, a heater in said housing adjacent said opening for heating air passing therethrough, said outlet chamber having a first compartment outlet and a blower outlet, a blower, means connecting the intake of said blower to said blower outlet, means for delivering the air discharged from said blower having a delivery outlet and a second compartment outlet, a door adapted to control the passage of air from the first compartment outlet, a movable baffle for directing air delivered from said blower into said second compartment outlet and said delivery outlet, said baffle being movable to a first position substantially blocking said delivery outlet and wherein the major portion of the air from said blower is delivered to the second compartment outlet and to a second position substantially blocking said second compartment outlet and wherein the major portion of the air is delivered to said delivery outlet, and means interconnecting said baffle with said door so that said baffle is actuated to said first position simultaneously with the opening of said door and is movable in a direction away from the first position to said second position when said door is closed.

2. In a heating and ventilating device for the passenger compartment of a vehicle, a housing having a heat-change element therein and chambers on opposite sides of said element, said element having passages therethrough to allow the flow of air between said chambers, means for supplying air to one of said chambers, the other of said chambers being adapted to receive air from said element and having a first compartment outlet for delivering air to said compartment and a blower outlet, heat-exchange element by-pass means movable to open and closed positions for supplying air directly to said other chamber, control means for controlling the operation of said element and having a position wherein the element is rendered inoperative, means interconnecting said control means and said by-pass means for actuating the by-pass to open position when said control means renders said element inoperative, a movable door for controlling the delivery of air from said first outlet, a blower, means connecting the intake of said blower to said blower outlet, means having a second compartment outlet and another outlet for delivering air discharged from said blower, gate means for dividing the air discharged from said blower between the second compartment outlet and the said another outlet, said gate means being movable to a first position wherein the major portion of the air from the blower is directed into the second compartment outlet and to a second position wherein the major portion of the air is directed into said another outlet, and means interconnecting said door and said gate means such that the gate means is actuated to said first position when said door is open and is movable in a direction away from said first position to said second position when said door is substantially closed.

3. In a heating and ventilating device for the passenger compartment of a vehicle, a housing having a heat-exchange element therein and chambers on opposite sides of said element, said element having passages therethrough to allow the flow of air between said chambers, one of said chambers being an inlet chamber and the other of said chambers being adapted to receive air from said element and having a first compartment outlet for delivering air to said compartment and a blower outlet, a door movable to control the delivery of air from said first compartment outlet, a blower, means connecting the intake of said blower to said blower outlet, means having a second compartment outlet and another outlet for delivering air discharged from said blower, baffle means for dividing the air discharged from said blower between the second compartment outlet and the said another outlet, said baffle means being movable to a first position substantially blocking said another outlet and wherein the major portion of the air from the blower is directed into the second compartment outlet and to a second position substantially blocking said second compartment outlet and wherein the major portion of the air is directed to said another outlet, switch means for controlling the operation of said blower, and means connecting said switch and said door for moving said door to a position restricting the first compartment outlet when said blower is operated and interconnecting said door and said baffle means such that the baffle means is actuated to said first position when said door is open and is movable in a direction away from said first position to said second position when said door is substantially closed.

4. In a heating and ventilating device for the passenger compartment of a vehicle, a housing having a heat-exchange element therein and chambers on opposite sides of said element, said element having passages therethrough to allow the flow of air between said chambers, one of said chambers being an inlet chamber and the other being adapted to receive air from said element and having a first compartment outlet for delivering air to said compartment and a blower outlet, by-pass means interconnecting said chambers for by-passing said element, said by-pass means having open and closed positions, control means for controlling the operation of said element having a position wherein the element is rendered inoperative, means interconnecting said control means and said by-pass means for actuating the by-pass to open position when said element is rendered inoperative, a movable door for controlling the delivery of air from said first outlet, a blower, means connecting the intake of said blower to said blower outlet, means having a second compartment outlet and another outlet for delivering air discharged from said blower, gate means for directing the air discharged from said blower into the second compartment outlet and the said another outlet, said gate means being movable to a first position wherein the major portion of the air from the blower is directed into the second compartment outlet and to a second position wherein the major portion of the air is directed into said another outlet, switch means for controlling the operation of said blower, and means connecting said switch and said door for actuating said door to a position restricting the first compartment outlet when said blower is operating and interconnecting said door and said gate means such that the gate means is actuated to said first position when said door is open and is movable in a direction away from said first position to said second position when said door is substantially closed.

5. In a heating and ventilating device for the passenger compartment of a vehicle, a housing having a heat-exchange element therein and chambers on opposite sides of said element, said element having passages therethrough to allow the flow of air between said chambers, means for supplying air to one of said chambers, the other of said chambers being adapted to receive air from said element and having a first compartment outlet for delivering air to said compartment and a blower outlet, by-pass means communicating with said chambers for by-passing said element, a door movable to control the delivery of air from said first compartment outlet, a multispeed blower, means connecting the intake of said blower to said blower outlet, a second compartment outlet and another outlet for delivering air discharged from said blower, baffle means for dividing the air discharged from said blower between the second compartment outlet and the said another outlet, said baffle means being movable to a first position wherein the major portion of the air from the blower is directed into the second compartment outlet and to a second position wherein the major portion of the air is directed into said another outlet, switch means for controlling the operation of said blower, and means connecting said switch and said door for moving said door to a position restricting the first compartment outlet when said blower is set to operate at one speed and for closing the first compartment outlet when the blower is set to operate at a higher speed and interconnecting said door and said baffle means such that the baffle means is actuated to said first position when said door is open and is movable in a direction away from said first position to said second position when said door is substantially closed.

6. In a heating and ventilating device for the passenger compartment of a vehicle, a housing having a heat-exchange element therein and chambers on opposite sides of said element, said element having passages therethrough to allow the flow of air between said chambers, means for supplying air to one of said chambers, the other of said chambers being adapted to receive air from said element and having a first compartment outlet for delivering air to said compartment and a blower outlet, by-pass means for said element movable to open and closed positions and operable to allow the passage of air directly from said inlet chamber to said outlet chamber, thermostatic means for controlling the operation of said element having a position wherein the element is rendered inoperative, means interconnecting said thermostatic means and said by-pass means for actuating the by-pass to open position when said thermostatic means is in a position rendering said element inoperative, a movable door for controlling the delivery of air from said first outlet, a multi-speed blower, means connecting the intake of said blower to said blower outlet, means having a second compartment outlet and another outlet for delivering air discharged from said blower, baffle means for dividing the air discharged from said blower between the second compartment outlet and the said another outlet, said baffle means being movable to a first position wherein the major portion of the air from the blower is directed into the second compartment outlet and to a second position wherein the major portion of the air is directed into said another outlet, switch means for controlling the operation of said blower, means connecting said switch and said door for moving said door to a position restricting the first compartment outlet when said blower is operating at one speed and for closing the first compartment outlet when the blower is operating at a higher speed and interconnecting said door and said baffle means such that the baffle means is actuated to said first position when said door is open and is movable in a direction away from said first position to said second position when said door is closed.

7. In a ventilating and heating system for supplying air to the defrosters and passenger compartment of a vehicle, a housing having a partition means therein forming an inlet chamber and a delivery chamber, said partition means having first and second openings therein for allowing the passage of air between said chambers, a heat-exchange element adjacent one of said openings, a cover for controlling the passage of air through the other of said openings, thermostatic means for controlling the operation of said element, said thermostatic means having a position wherein the heat-exchange element is rendered inoperative, means interconnecting said cover and the thermostatic means for actuating said cover to an open position when the heat-exchange element is rendered inoperative, said delivery chamber having a first compartment delivery outlet and a blower outlet, a blower, means connecting the intake of said blower to said blower outlet, means for delivering the air discharged from said blower having a defroster outlet and a second compartment outlet, a manually operated control lever, switch means for controlling the operation of said blower actuated by said lever, a door adapted to control the passage of air from the first compartment outlet, means connecting said door to said lever and interconnecting said switch and said door so that said door is actuated to a position restricting the passage of air from the first compartment outlet when said blower is operating, a movable baffle for directing air delivered from said blower to said second compartment outlet and said defroster outlet, said baffle being movable to a first position wherein the major portion of the air from said blower is delivered to the second compartment outlet and to a second position wherein the major portion of the air is delivered to said defroster outlet, actuating means for the baffle connecting the baffle to said lever and interconnecting the baffle with said switch and said door so that said baffle is in said first position when the door is opened and is movable in a direction away from said first position to said second position by operation of said lever when said door is closed.

8. In a ventilating and heating system for supplying air to the defrosters and passenger compartment of a vehicle, a housing having a partition means therein forming an inlet chamber and a delivery chamber, said partition means having an opening therein for allowing the passage of air between said chambers, a heat-exchange element adjacent said opening, by-pass means communicating with said chambers for by-passing said element, said delivery chamber having a first compartment delivery outlet and a blower outlet, a blower, means connecting the intake of said blower to said blower outlet, means for delivering the air discharge from said blower having a defroster outlet and a second compartment outlet, a manually operated control lever, switch means for controlling the operation of said blower actuated by said lever, a door adapted to control the passage of air from the first compartment outlet, means connecting said door to said lever and interconnecting said switch and said door so that said door is actuated to a position restricting the passage of air through the first compartment outlet when said blower is operating, a movable baffle for directing air delivered from said blower between said second compartment outlet and said defroster outlet, said baffle being movable to a first position where the major portion of the air from said blower is delivered to the second compartment outlet and to a second position where the major portion of the air is delivered to said defroster outlet, actuating means for the baffle connecting the baffle to said lever and interconnecting the baffle with said switch and said door so that said baffle is in said first position when the door is opened and is movable in a direction away from the first position to said second position by operation of said lever when said door is closed.

9. In a ventilating and heating system for supplying air to the defrosters and passenger compartment of a vehicle, a housing having partition means therein forming an inlet chamber and a delivery chamber, said partition means having first and second openings therein for allowing the passage of air between said chambers, a heat-exchange element adjacent one of said openings having a core in heat-exchange relationship to the air passing therethrough, a cover for controlling the passage of air through the other of said openings, thermostatic means for controlling the operation of said element and having a position wherein the element is rendered inoperative, means interconnecting said cover and thermostatic means for actuating the cover to an open position when the heat-exchange element is rendered inoperative, said delivery chamber having a first compartment outlet and a blower outlet, a multi-speed blower, means connecting the intake of said blower to said blower outlet, means for delivering the air discharged from said blower having a defroster outlet and a second compartment outlet, a manually operated control lever, switch means actuated by said lever for controlling the operation of said blower, a door adapted to control the passage of air from the first compartment outlet, means connecting said door to said lever and interconnecting said switch and said door so that the door is actuated to a restricted position when said blower is operated at one speed and to a closed position when operated at a higher speed, a movable baffle for directing air delivered from said blower to said second compartment outlet and said defroster outlet, said baffle being movable to a first position where the major portion of the air from said blower is delivered to the second compartment outlet and to a second position where the major portion of the air is delivered to said defroster outlet, actuating means for the baffle connecting the baffle to said lever and interconnecting the baffle with said switch and said door so that said baffle is in said first position when the door is opened and is movable in a direction away from the first position to said second position by operation of said lever when said door is closed.

10. In a ventilating and heating system for supplying air to the defrosters and passenger compartment of a vehicle, a housing having a partition means therein forming an inlet chamber and a delivery chamber, said partition means having an opening therein for allowing the passage of air between said chambers, a heat-exchange element adjacent said opening having a core in heat-exchange relation with the air passing therethrough, by-pass means communicating with said chambers for by-passing said element, said delivery chamber having a first compartment outlet and a blower outlet, a multi-speed blower, means connecting the intake of said blower to said blower outlet, means for delivering the air discharged from said blower having a defroster outlet and a second compartment outlet, a manually operated control lever, switch means actuated by said lever for controlling the operation of said blower, a door adapted to control the passage of air from the first compartment outlet, means connecting said door to said lever and interconnecting said switch and said door for actuating said door to a restricted position when said blower is operated at one speed and to a closed position when operated at a higher speed, a movable baffle for directing air delivered from said blower to said second compartment outlet and said defroster outlet, said baffle being movable to a first position where the major portion of the air from said blower is delivered to the second compartment outlet and to a second position where the major portion of the air is delivered to said defroster outlet, actuating means for said baffle connecting the baffle to said lever and interconnecting the baffle with said switch and said door so that the baffle is in said first position when the door is open and is movable in a direction away from the first position to said second position by movement of said lever when the door is closed.

11. In a ventilating and heating system for supplying air to the defrosters and passenger compartment of an automobile, a housing having an open top and perpendicularly related partion means defining an inlet chamber and an outlet chamber, said first and second partition means having first and second openings therein respectively to allow the passage of air between said chambers and including a heater element adjacent one of said openings for heating air passing therethrough, means for controlling the passage of air through the other of said openings, said outlet chamber having a first compartment delivery outlet and a blower outlet, a blower, means connecting the intake of said blower to said blower outlet, means for delivering the air discharge from said blower having a defroster outlet and a second compartment outlet, a manually operated pivotally mounted control lever, switch means for controlling the operation of said blower actuated by said lever, a door adapted to control the passage of air from the first compartment outlet, means connecting said door to one end of the crosspiece of said lever and interconnecting said switch and said door so that said door is actuated to a restricted position when said blower is operating, a movable baffle for directing air delivered from said blower into said defroster outlet and the second compartment outlet, said baffle being movable to a first position where the major portion of the air from said blower is delivered to the second compartment outlet and to a second position where the major portion of the air is delivered to said defroster outlet, means for actuating the baffle connecting the baffle to the other end of the crosspiece of said lever and interconnecting the baffle with said switch and said door so that said baffle is in said first position when the door is open and is movable in a direction away from the first position to said second position by movement of said lever when the door is substantially closed.

12. In a ventilating and heating system for supplying air to the defrosters and passenger compartment of an automobile, a housing having perpendicularly related first and second partition means defining an inlet chamber and an outlet chamber, said first and second partition means having first and second openings respectively, a heater adjacent one of said opening for heating air passing therethrough, means for controlling the flow of air through the other of said openings, said outlet chamber having a first compartment delivery outlet and a blower outlet, a multi-speed blower, means connecting the intake of said blower to said blower outlet, means for receiving the air discharged from said blower having a defroster outlet and a second compartment outlet, a manually operated pivotally mounted control lever, a door adapted to control the passage of air from the first compartment outlet, means operatively connecting said door to one end of the crosspiece of said lever for opening and closing said door, switch means operated by said lever to control the operation of said blower, said switch being interconnected with said door through said lever to operate said blower at one speed when said door is partially closed and at a higher speed when closed, and a movable baffle for directing air discharged from said blower into said second compartment outlet and said defroster outlet, said baffle being movable to a first position where the major portion of the air discharged from said blower is directed into said compartment outlet and to a second position where the major portion of the air is directed into said defroster outlet, and means for operating said baffle connected to the other end of the crosspiece of the lever and interconnecting said baffle and said door whereby said baffle is in its first position when said door is open and is movable to its second said position after said door is closed by movement of said lever.

13. In a ventilating and heating system for supplying air to the defrosters and passenger compartment of a vehicle, a housing having one side open to form an air inlet and first and second partition means therein extending substantially perpendicularly to each other and defining with the housing an inlet chamber and a delivery chamber, said first and second partition means having first and second openings therein respectively for allowing the passage of air between said chambers, a heat-exchange element adjacent one of said openings, a door for controlling the passage of air through the other of said openings, thermostatic means for controlling the operation of said element, said thermostatic means having a position wherein the heat-exchange element is rendered inoperative, substantially lost motion means connecting said door and the thermostatic means for actuating said door to an open position when the heat-exchange element is rendered inoperative, said outlet chamber having a first compartment delivery outlet and a blower outlet, a multi-speed blower, means connecting the intake of said blower to said blower outlet, means for delivering the air discharged from said blower having a defroster outlet and a second compartment outlet, a manually operated pivotally mounted control lever, switch means for controlling the operation of said blower actuated by said lever, a door adapted to control the passage of air from the first compartment outlet, means connecting said door to said lever and interconnecting said switch and said door so that said door is actuated to a restricted position when said blower is operating, a movable baffle for directing air delivered from said blower between said second compartment outlet and said defroster outlet, said baffle being movable to a first position where the major portion of the air from said blower is delivered to the second compartment outlet and to a second position where the major portion of the air is delivered into said defroster outlet, and actuating means connecting the baffle to the other end of the crosspiece of said lever and interconnecting the baffle with said switch and said door so that said baffle is in said first position when the door is opened and is movable in a direction away from the first position to said second position when said door is closed substantially.

14. In a ventilating and heating system for supplying air to the defrosters and passenger compartment of a vehicle, a housing having partition means therein forming adjacent inlet and outlet chambers, said partition means having first and second openings therethrough communicating with each of said chambers for allowing the passage of air between said chambers and including a heat-exchange element adjacent one of said openings having a core in heat-exchange relationship to air passing therethrough, a cover for controlling the passage of air through the other of said openings, said outlet chamber having a first compartment outlet and a blower outlet, a door for controlling the passage of air from the first compartment outlet, blower means comprising a blower shell fixed to said housing and having an inlet opening registering with said blower outlet and including means defining a delivery chamber for delivering the air discharged from said blower, said delivery chamber having a delivery outlet and a second compartment outlet, and a movable baffle for directing air delivered from said delivery chamber to said second compartment outlet and said delivery outlet, said baffle being movable to a first position where the major portion of the air from said blower is delivered to the second compartment outlet and to a second position where the major portion of the air is delivered to said delivery outlet.

15. In a ventilating and heating system for automotive vehicles, a box-like housing having bottom, front, back and side walls, the top thereof being open, a first partition extending inwardly from the front wall, a second partition extending generally perpendicular to the first partition, said partitions defining with the external walls of said housing two chambers, one of said chambers communicating with the open top of the housing and constituting an inlet chamber, the other chamber being a closed chamber and constituting an outlet chamber, each of said partitions having an opening therein for allowing the passage of air between said chambers, and one of said partitions including a heat-exchange element for heating air passing through the opening therein, a first door mounted for movement to and from a position closing the other of said partition openings, said outlet chamber having a first outlet and a second outlet, a second door mounted for controlling the passage of air from the first outlet, means defining a delivery chamber for receiving air from the second outlet and having third and fourth outlets, and a baffle mounted in said delivery chamber movable to divide the air delivered by said chamber between said third and fourth outlets.

References Cited in the file of this patent
UNITED STATES PATENTS

| | | |
|---|---|---|
| 2,306,796 | Staley et al. | Dec. 29, 1942 |
| 2,488,278 | Findley | Nov. 15, 1949 |
| 2,605,688 | Hezler | Aug. 5, 1952 |
| 2,627,218 | Katz | Feb. 3, 1953 |
| 2,631,517 | Duhn | Mar. 17, 1953 |
| 2,634,670 | Simons | Apr. 14, 1953 |